United States Patent
Nonomura et al.

[11] Patent Number: 5,822,541
[45] Date of Patent: Oct. 13, 1998

[54] COMPRESSED VIDEO DATA AMOUNT REDUCING DEVICE, COMPRESSED VIDEO DATA AMOUNT REDUCING SYSTEM AND COMPRESSED VIDEO DATA AMOUNT REDUCING METHOD

[75] Inventors: Itaru Nonomura, Tokyo; Shinichi Hashimoto, Hadano; Takeo Tomokane, Yokohama; Takao Shimada, Yokohama; Takahiro Yamada, Yokohama, all of Japan

[73] Assignee: Hitachi, Ltd., Tokyo, Japan

[21] Appl. No.: 728,551

[22] Filed: Oct. 9, 1996

[30] Foreign Application Priority Data

Oct. 9, 1995 [JP] Japan .................................. 7-261690

[51] Int. Cl.⁶ .................................................. H04N 1/413
[52] U.S. Cl. ............................ 395/200.77; 395/200.61; 348/394; 348/403; 348/415; 382/236; 382/238; 382/248
[58] Field of Search ................... 364/715.02; 395/200.77, 395/888, 200.32, 200.61, 200.68; 348/394, 403, 415; 382/236, 238, 248

[56] References Cited

U.S. PATENT DOCUMENTS 5,666,161 9/1997 Kohiyama et al. ...................... 348/408
5,668,598 9/1997 Linzer ..................................... 348/402

FOREIGN PATENT DOCUMENTS 5-316357 11/1993 Japan .

OTHER PUBLICATIONS

*Point Diagrammatical Newest MPEG Text*, pp. 89–165, published Aug. 1, 1994, by ASCII Company (in Japanese).

*Primary Examiner*—Thomas Peeso
*Attorney, Agent, or Firm*—Antonelli, Terry, Stout & Kraus, LLP

[57] ABSTRACT

According to a data amount reducing device for reducing the data amount of compressed video data in which the compressed video data has a format having a control information portion comprising control information which contains information on picture size and bit rate and is adapted to determine the characteristics of the compressed video data, and a data portion comprising compressed video data of plural frames, the data amount of intra-coded frames contained in the data portion in the compressed video data is reduced, and the control information is altered so as to match the compressed video data after the reduction processing.

8 Claims, 15 Drawing Sheets

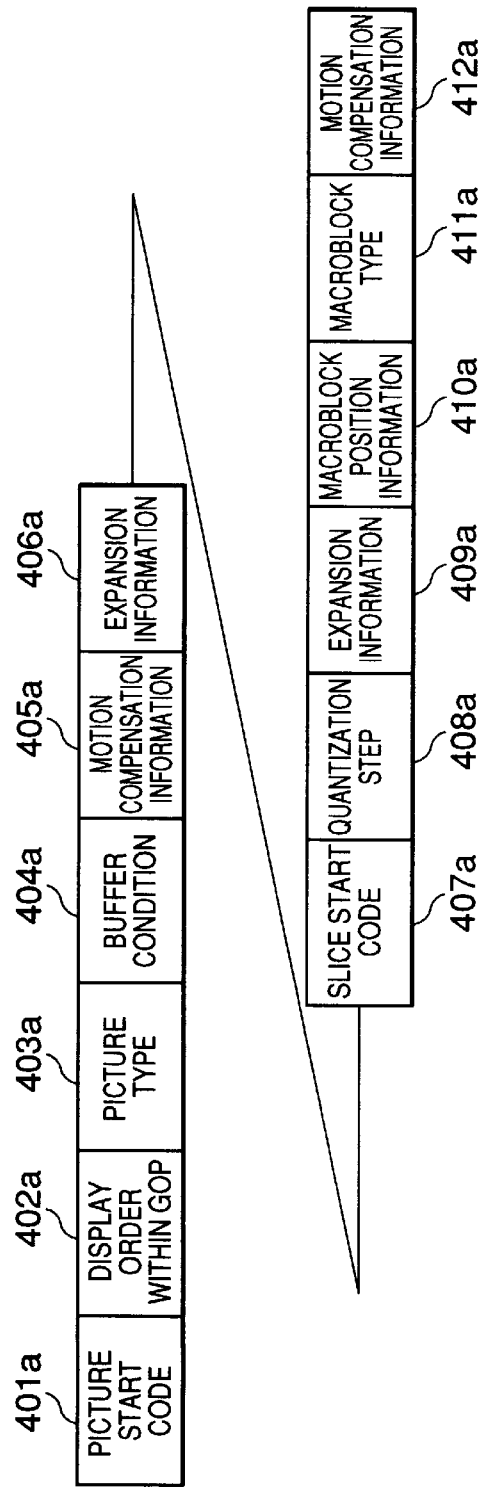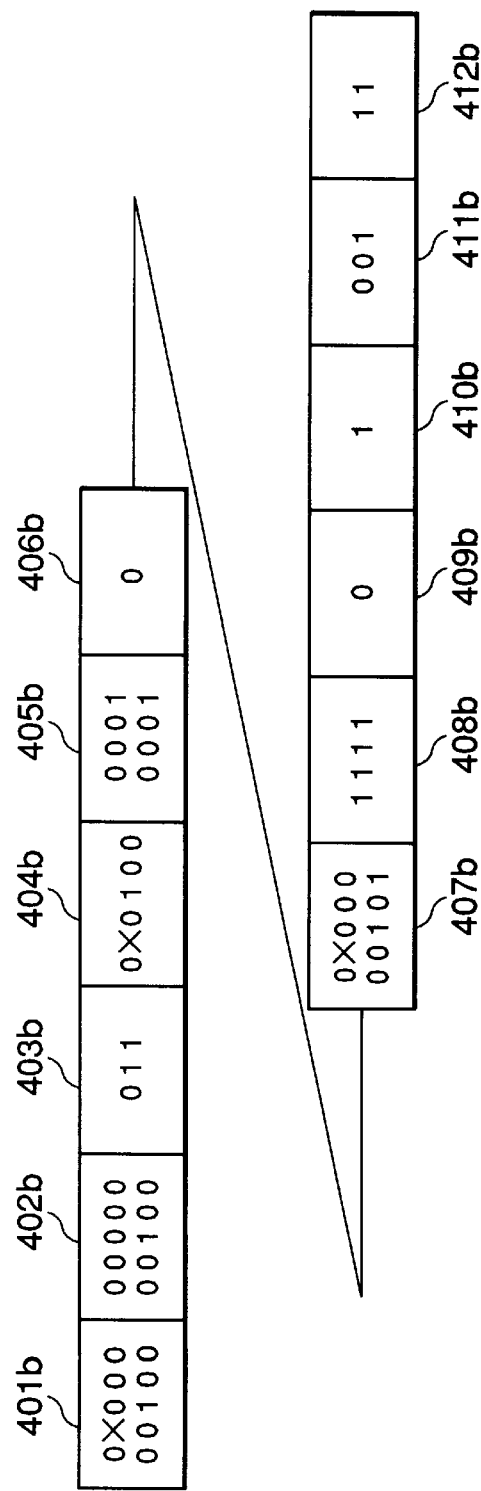

COMPRESSED VIDEO DATA AMOUNT REDUCING DEVICE, COMPRESSED VIDEO DATA AMOUNT REDUCING SYSTEM AND COMPRESSED VIDEO DATA AMOUNT REDUCING METHOD

BACKGROUND OF THE INVENTION

1. Field of the Invention

The present invention relates to a device for processing compressed video data (or moving picture data) and reducing the data amount of the compressed video data with high efficiency using a simple construction. More particularly, the present invention relates to an apparatus and a method for reducing the data amount of compressed video data, which are suitable for use as a video server (or moving picture server) for distributing compressed video data to a client side through a network, and a gateway for distributing video data received through a network to a client side through a different network.

2. Description of Related Art

Recently, various networks such as LANs (Local Area Networks), etc. have become widespread among offices and the performance thereof has also been enhanced. In addition, an access environment to the Internet has also been established. In connection with such development of the network system, there is a sign of propagation of a multimedia data transmission system in which video data are communicated through networks between plural information processing devices.

Such a multimedia data transmission system is constructed so that video data stocked in an information processing device serving as a supplier for video data are supplied to another information processing device through networks.

When video data are stored or transmitted, these video data are generally subjected to compression processing to reduce the storage capacity of a memory which is required for data storage, or to shorten a transmission time because the data amount of the video data is very large. Various manners for compressing video data have been proposed, and the MPEG (Moving Picture Experts Group) system is one of the most typical systems, which has been proposed by ISO (International Standardization Organization).

Outlines of the MPEG system are described in various documents such as "Point Diagrammatical Newest MPEG Text": Aug. 1, 1994, issued by ASCII Company, pp89–165, etc.

With respect to a multimedia data transmission system which has a low transmission speed, that is, a low data transmission capability, it requires a long time for data transmission even when it handles compressed video data. For example, a transmission time of about 24 minutes is needed when one minute worth of video data which are compressed at a data compression speed of 1.5M bits per second, the data amount thereof corresponding to a standard data capacity of the MPEG1 (MPEG phase 1) system, are transmitted by using N-ISDN (Narrow-Integrated Service Digital network) having a transmission speed of 64K bits per second.

Therefore, in order to quickly transmit compressed video data through a network having a relatively small data transmission amount per unit time such as N-ISDN or the like, the data amount of the compressed video data must be further reduced. There may be proposed a method of reducing the number of frames per unit time (hereinafter suitably referred to as "frame rate"), a method for reducing the pixel number which corresponds to the number of pixels constituting a frame, etc. in order to reduce the data amount of the compressed video data as described above.

According to these methods, although the data amount can be reduced, the image quality is remarkably degraded. Therefore, there have been proposed techniques for reducing the data amount while minimizing the degradation of the image quality.

As one of these techniques, there is known a technique for thinning out a part of frames contained in video data to reduce the frame rate. However, this method is not applicable to some types of frames. For example, with respect to a predictive-coded frame compressed by using the correlative relationship with other frames, and frames before and after the frame concerned must be referred to in a decoding operation. Therefore, the above method is not applicable to this case.

Further, with respect to video data having a remarkably small data amount per unit time, it is better for improvement in image quality to increase the data amount per frame and enhance the resolution by reducing the frame rate although smooth motion is lost slightly. However, in the MPEG 1 system or MPEG2 (MPEG phase 2) system, the lower limit value of a permissible frame rate range is equal to 23.976 frames per second, and thus video data having a frame rate below the lower limit value cannot be decoded on a real-time basis by a normal reproducing device.

Still further, it is generally true that the pixel number of video data cannot be changed when the video data are under compression. Therefore, for reduction of the pixel number, it is required to first subject the compressed video data to decoding processing to obtain non-compressed image data, then subject the non-compressed image data to reduction processing, and then subjecting the image data to coding processing again. Accordingly, this method needs a series of decoding processing, reduction processing and coding processing, so that the processing amount is increased.

Of these problems of the prior art techniques as described above, the problem which is caused when the data reduction processing based on the reduction processing of the pixel number is performed could be solved by a conventional technique in which the reduction processing is performed on compressed image data to reduce the processing amount for the reduction of the data amount while not decoding the compressed image data to non-compressed image data.

For example, Japanese Laid-open Patent Application No. Hei-5-316357 discloses a technique in which image data compressed and coded according to an orthogonal transformation coding system are subjected to the reduction processing in a frequency space to thereby reduce the data amount. However, if this method is applied to compressed video data containing data which are coded according to a motion compensation predicting system, images would be disturbed.

An object of the present invention is to provide a simply structured device which can solve the above problems and which can reduce the data amount of compressed video data with a small processing amount while suppressing degradation of image quality, and a gateway, a video server, etc. to which the device is applied.

In more detail, an object of the present invention is to provide a data amount reducing device and a data amount reducing method in which intraframe predictive-coded frames (hereinafter referred to as "intra-coded frames" (i.e., I picture frames)) which constitute compressed video data and are compressed by using no correlative relationship with other frames are reduced to reduce the data amount, and both of preceding interframe predictive-coded frames (hereinafter referred to as "predictive-coded frames" (i.e., P picture frames)) which are compressed by using the correlative relationship with preceding or past frames and bidirectional interframe predictive-coded frames (hereinafter referred to as "bidirectional predictive-coded frames" (i.e., B picture frames)) which are compressed by using the correlative relationship with past frames and future frames are reduced or replaced by dummy data having a smaller data capacity to thereby reduce the data amount of the compressed video data, whereby the data amount of the compressed video data can be reduced using a small amount of processing steps while keeping excellent image quality.

SUMMARY OF THE INVENTION

In order to attain the above objects, according to a first aspect of the present invention, a data amount reducing device for reducing the data amount of compressed video data which have been compressed according to a predetermined compression rule, is characterized in that the compressed video data includes a control information portion comprising control information which contains information on picture size and bit rate and is adapted to determine the characteristics of the compressed video data, and that a data portion comprising compressed video data of plural frames, and the data amount reducing device includes intraframe predictive image data amount reducing means for reducing the data amount of intra-coded frames which are contained in the data portion and have been compressed by using no correlative relationship with other frames, and control information altering means for altering the control information so as to match the compressed video data after the reduction processing by the intraframe predictive image data amount reducing means.

The data amount reducing device preferably further includes replacing means for replacing both of predictive-coded frames contained in the data portion and compressed by using the correlative relationship with past frames and bidirectional predictive-coded frames contained in the data portion and compressed by using the correlative relationship with past and future frames, by predetermined dummy data having a smaller capacity than that of each frame.

According to another aspect of the data amount reducing device for reducing the data amount of compressed video data which are compressed according to a predetermined compression rule, the compressed video data includes a control information portion comprising control information which contains information on picture size and bit rate and is adapted to determine the characteristics of the compressed video data, and the data amount reducing device includes intraframe predictive image data amount reducing means for reducing the data amount of intra-coded frames which are contained in the data portion and have been compressed by using no correlative relationship with other frames, interframe predictive image data amount reducing means for reducing the data amount of preceding predictive-coded frames which are contained and have been compressed by using the correlative relationship with past frames, and control information altering means for altering the control information so as to match the compressed video data after the reduction processing by the intraframe predicted picture data amount reducing means and the interframe predictive image data amount reducing means.

The data amount reducing device as described above preferably further includes replacing means for replacing bidirectional predictive-coded frames contained in the data portion and compressed by using the correlative relationship with past and future frames, by predetermined dummy data having a smaller capacity than that of each frame.

According to another aspect of the present invention, a data amount reducing method for reducing the data amount of compressed video data which have been compressed according to a predetermined compression rule, is characterized in that the compressed video data includes a control information portion comprising control information which contains information on picture size and bit rate and is adapted to determine the characteristics of the compressed video data, and a data portion comprising compressed video data of plural frames, and the data amount reducing method comprises the steps of reducing the data amount of intra-coded frames which are contained in the data portion and have been compressed by using no correlative relationship with other frames, replacing each of predictive-coded frames contained in the data portion and compressed by using the correlative relationship with past frames and bidirectional predictive-coded frames contained in the data portion and compressed by using the correlative relationship with past and future frames, by predetermined dummy data which has a smaller capacity of each of the frames and has no effect on the images of the other frames even when subjected to decompression processing, and altering the control information so as to match the compressed video data after the reducing processing and the replacement processing.

According to another aspect of the data amount reducing method, the compressed video data includes a control information portion comprising control information which contains information on picture size and bit rate and is adapted to determine the characteristics of the compressed video data, and a data portion comprising compressed video data of plural frames, and the data amount reducing method comprises the steps of reducing the data amount of intra-coded frames which are contained in the data portion and have been compressed by using no correlative relationship with other frames, reducing the data amount of predictive-coded frames contained in the data portion and compressed by using the correlative relationship with past frames, and replacing bidirectional predictive-coded frames contained in the data portion and compressed by using the correlative relationship with past and future frames, by predetermined dummy data which has a smaller capacity of each of the frames and has no effect on the images of the other frames even when subjected to decompression processing, and altering the control information so as to match the compressed video data after the reducing processing and the replacement processing.

BRIEF DESCRIPTION OF THE DRAWINGS

FIGS. 4A and 4B are diagrams showing dummy data which are used in data amount reducing processing;

DESCRIPTION OF THE PREFERRED EMBODIMENTS

Preferred embodiments according to the present invention will be described hereunder with reference to the accompanying drawings.

In the following description, the following assumption is made because MPEG is adopted as an example of the compression rule of video data. It is needless to say that the compression rule of the video data is not limited to the following special one, and any rule such as "H.261" or the like may be used.

That is, "I picture" in the MPEG is assumed to be an "intra-coded frame" which is a frame compressed by using no correlation with other frames, "P picture" in the MPEG is assumed to be a "predictive-coded frame" which is a frame compressed by using the correlative relationship with past frames, and "B picture" in the MPEG is assumed to be a "bidirectional predictive-coded frame" which is a frame compressed by using the correlative relationship with past and future frames.

First, a first embodiment according to the present invention will be described. In the first embodiment, the present invention is applied to a gateway.

Figure 1:
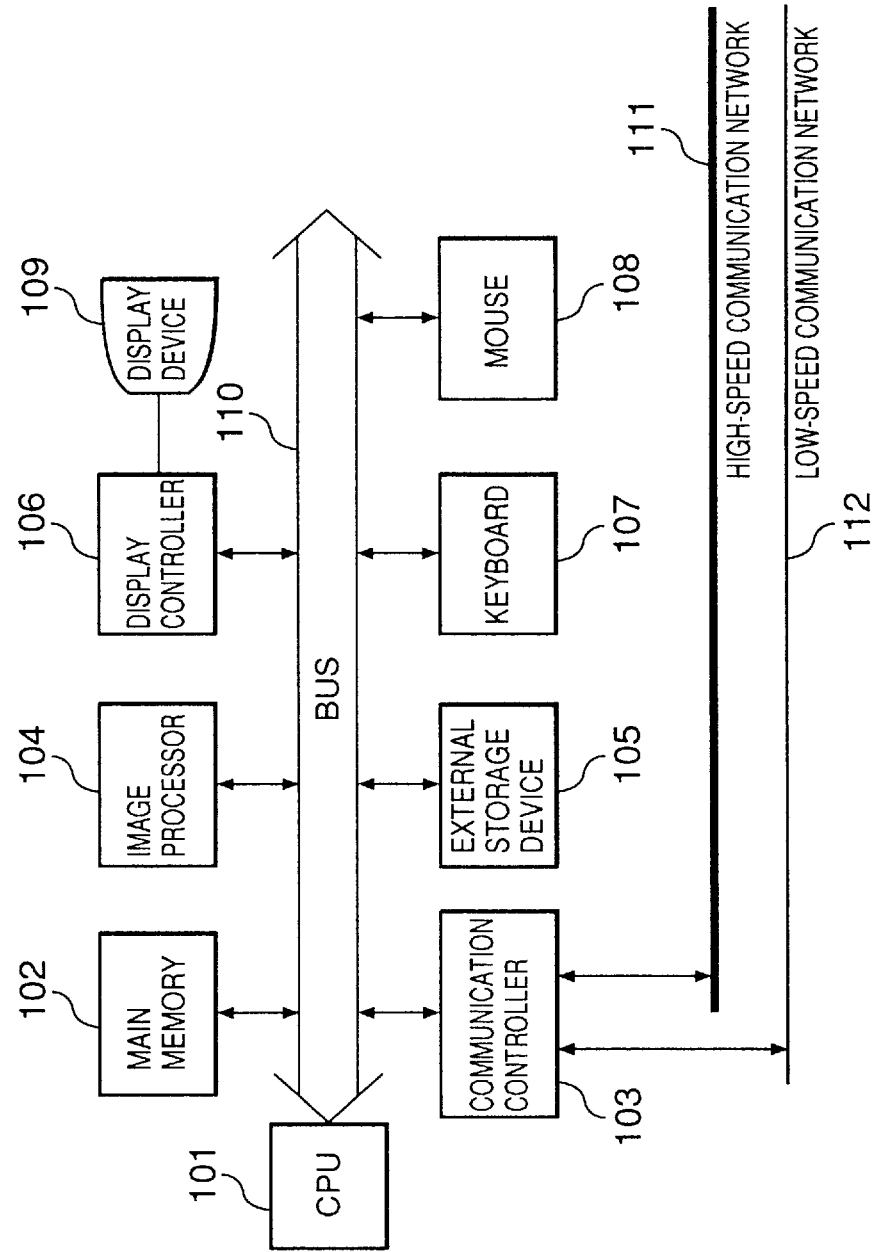
FIG. 1 is a block diagram showing the construction of a gateway according to a first embodiment of the present invention.

As shown in FIG. 1, a gateway includes a CPU 101 which performs various control operations according to a predetermined program, a main memory 102 for storing the program to executed by the CPU 101, etc., a communication controller 103 having a communication function of video data which have been already compressed (hereinafter referred to as "compressed video data"), an image processor 104 having a data reducing processing function, an external storage device 105 for storing data, etc. to be communicated through the communication controller 103, a display device 109 for displaying various data and various processing results, a display controller 106 for controlling the display device 109, a keyboard 107 for inputting predetermined commands, etc., a mouse 108 for inputting desired information, and a bus 110 for communicating data among the constituent elements. Further, a high-speed communication network 111 and a low-speed communication network 112 are connected to the communication controller 103.

The high-speed communication network 111 is a communication medium having a capability of communicating a larger data amount (a larger data transmission amount per unit time) than the low-speed communication network 112, and for example an optical fiber cable may be used for both the communication media.

Various commands, for example, to start and stop the data amount reducing device are provided as predetermined commands input through the keyboard 107.

In the following description, the data transmission among the constituent elements through the main memory 102, the communication controller 103, the external storage device 105, the display controller 106, the keyboard 107, the mouse 108 and the bus 110 is controlled according to a predetermined program by the CPU 101.

The CPU 101 reads in a request bit rate after reduction of data (the data amount of the video data per unit time) and information of a request pixel number after the data reduction processing from a user using the gateway through the keyboard 107 or the mouse 108, and outputs the read-in request bit rate and the request pixel number to the image processor 104.

Further, through the communication controller 103, the CPU 101 receives the video data transmitted from the high-speed communication network 111, and outputs the received video data to the image processor 104. Further, the CPU 101 reads in low-capacity video data after the data amount reduction processing from the image processor 104, and then outputs the read-in low-capacity video data through the communication controller 103 to the low-speed communication network 112.

The device may be designed so that the CPU 101 receives the request bit rate and the request pixel number from a client side through the low-speed communication network 112 and the communication controller 103. Further, it may be designed so that the user of the gateway or the gateway investigates the transmission speed of the low-speed communication network 112 to calculate and set proper request pixel number and request bit rate on the basis of the transmission speed, or refers to a preset parameter table in the main memory 102 to determine the request pixel number and the request bit rate on the basis of the transmission speed.

The main memory 102 has not only a function of storing various software required for the operation of the gateway, but also a function of serving as a work area or the like for temporarily storing data at the time of execution of software. For example, it is achieved by a semiconductor memory.

The communication controller 103 serves to control the data transmission between the gateway and the high-speed communication network 111, and the data transmission between the gateway and the low-speed communication network 112.

The external storage device 105 is used to store data received from the high-speed communication network 111 to the communication controller 103. For example, a storage medium such as a magnetic disk, a magnetic tape, an optical disk, a magneto-optical disk or the like may be detachably mounted in the external storage device 105 to enable access to the mounted storage medium.

The display controller 106 receives display data of texts or graphics transmitted from the CPU 101, converts the display data to display signals and then outputs the display signals onto a display screen of the display device 109.

The high-speed communication network 111 is a network such as a LAN (Local Area Network), ATM (Asynchronous Transfer Mode) network, B-ISDN (Broad-ISDN), N-ISDN or the like, and the low-speed communication network 112 is a network such as an N-ISDN, an analog telephone line network or the like.

Here, the image processor 104, which is the main part of the present invention, will be described with reference to FIG. 2.

Figure 2:
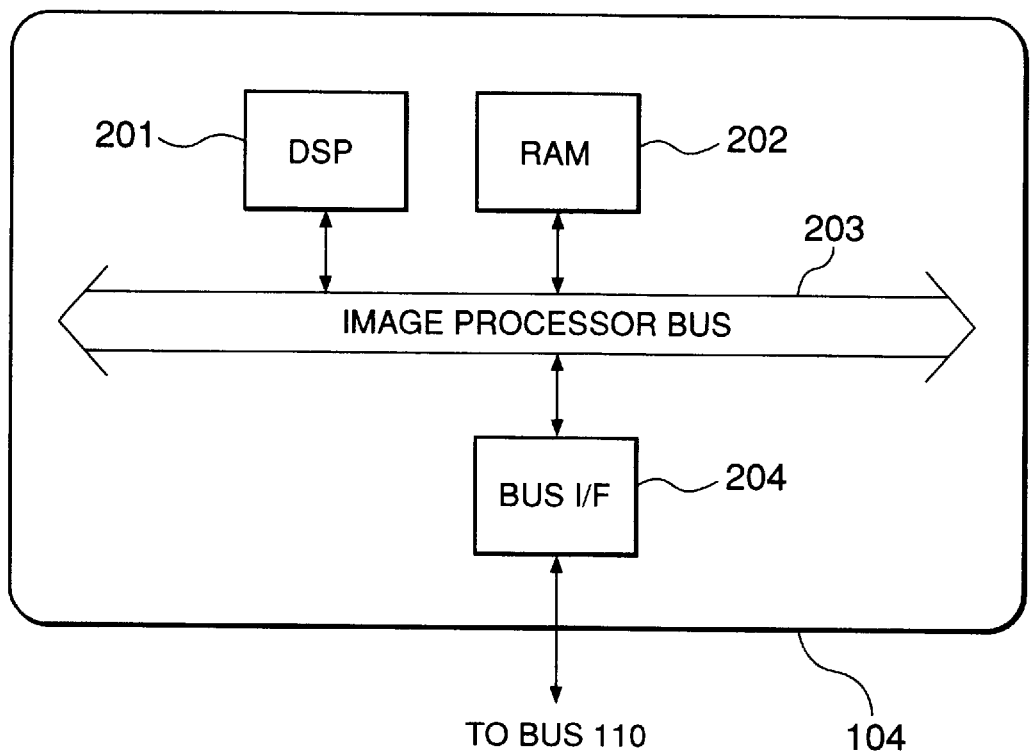
FIG. 2 is a block diagram showing the construction of an image processor according to the first embodiment of the present invention.

As shown in FIG. 2, the image processor 104 includes DSP (Digital Signal Processor) 201, RAM (Random Access Memory) 202, an image processor bus 203 and a bus I/F 204, and the bus I/F 204 is connected to the bus 110 shown in FIG. 1.

Here, each constituent element of the image processor 104 will be described. The DSP 201 performs the reduction processing of the data amount of compressed video data. The RAM 202 is used to store software to be executed by the DSP 201, and is also used as a work area or the like in which data is temporarily stored at the time of execution of the software. The RAM 202 is constructed by a semiconductor memory, for example. The software to be executed by the DSP 201 is stored in the external storage device 105 in advance, and the software to be executed is loaded into the RAM 202 when the system is started.

The bus I/F 204 performs data communication with the bus 110, and also performs data communication with the image processor bus 203.

The processing in the image processor 104 is performed as follows. That is, the data transmission processing between the RAM 202 and the CPU 101 is performed under the control of the CPU 101, and the processing other than the data transmission between the RAM 202 and the CPU 101 is performed upon execution of the software, stored in the RAM 202, by the DSP 201.

Figure 11:
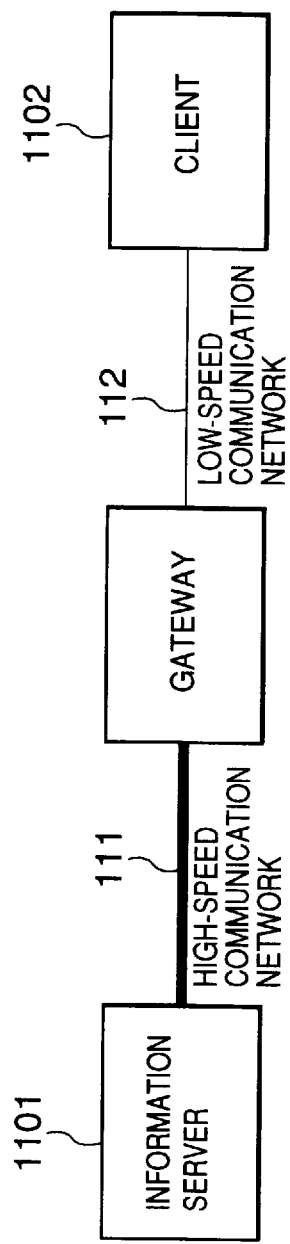
FIG. 11 is a block diagram showing the construction of a system having a gateway suitable for the present invention.

FIG. 11 is a diagram showing the construction of a video data transmission system using a gateway. The system shown in FIG. 11 includes an information server 1101 for supplying video data, a gateway 112 for performing data conversion processing between networks, and a client 1102 which receives the supply of the video data. Further, the information server 1101 and the network gateway 112 are connected to each other through the high-speed communication network 111, and the gateway 112 and the client 1102 are connected to each other through the low-speed communication network 112. The high-speed communication network 111 is a communication medium having a larger data transmission amount per unit time than the low-speed communication network 112.

Next, a series of processing steps of the gateway 112, containing the steps of reducing the data amount of video data of MPEG1 format (hereinafter referred to as "MPEG1-formatted video data") which are received from the information server 1101 through the high-speed communication network 111 to the gateway 112, creating the MPEG1-formatted low-capacity video data, and transmitting the low-capacity video data through the low-speed communication network 112 to the client 1102, will be described.

Specifically, the data amount reducing processing of the compressed video data which is executed in the image processor 104, that is, the procedure of the main processing of the present invention will be described with reference to FIGS. 3, 4 and 12.

Figure 3:
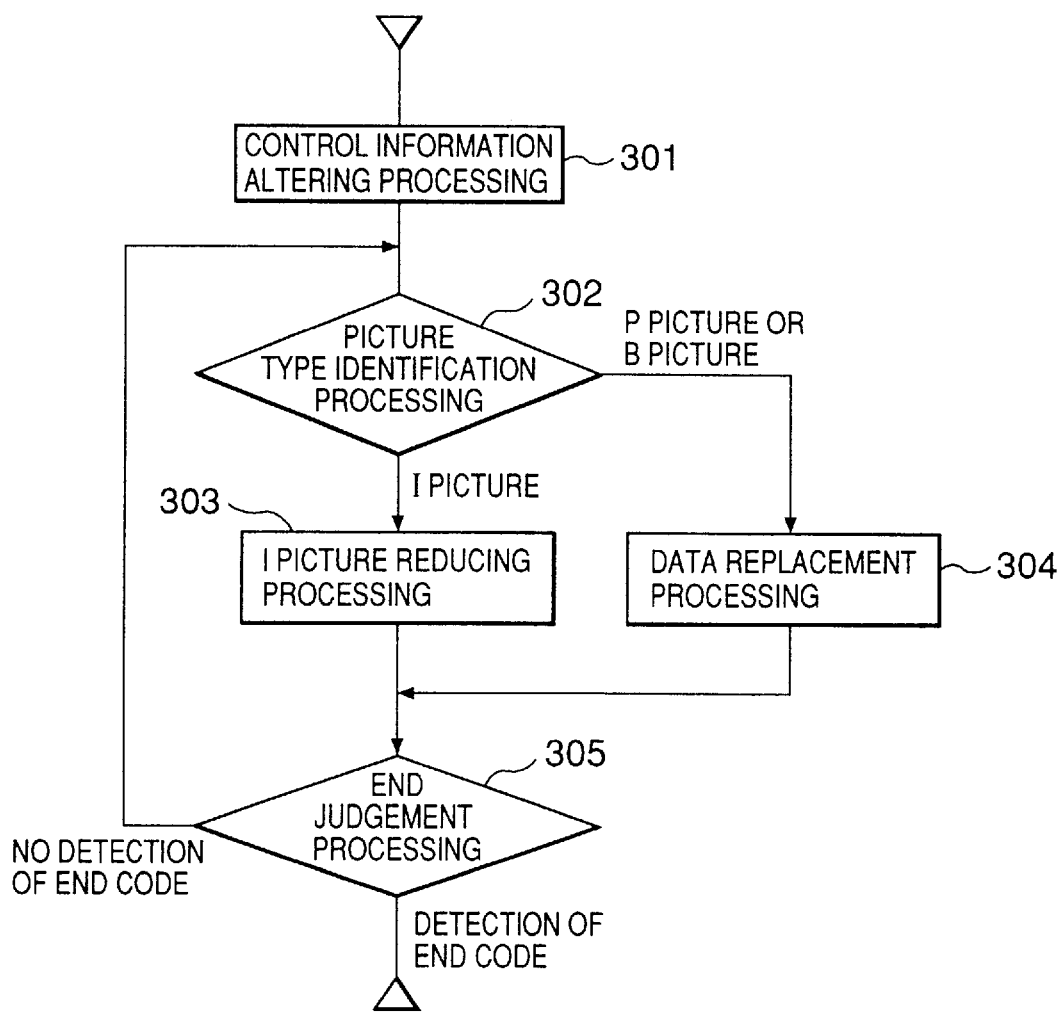
FIG. 3 is a flowchart showing data amount reducing processing.

FIG. 3 is a flowchart showing the procedure of the data amount reducing processing of the compressed video data. FIGS. 4A and 4B are diagrams showing the data structure of the dummy data. First, the dummy data and the control information will be described.

FIG. 4A shows a data field, and FIG. 4B shows an actual example of digital data. Data which begins with 0x are represented in hexadecimal notation, and each numeral other than 0x corresponds to 4 bits. The data which are represented by the same reference numerals correspond to each other in FIGS. 4A and 4B.

In FIGS. 4A and 4B, a picture start code 401 is a synchronous code representing the start of a picture.

Data which represents a display position in a GOP (Group of Pictures) of the picture concerned is set in a display order 402 within GOP. For example, when "10" is set, it means that the dummy data concerned exists at the "tenth" position in GOP.

The display order 402 within a GOP as described above corresponds to a parameter which varies for every dummy data.

Data which represents a picture type (in this case, data representing that the picture concerned is a bidirectional predictive-coded frame (B picture)) ("011") is set in a picture type 403. For example, "001" may be preset as "P picture".

In a buffer status 404, 16-bit information is set which represents the status of a reception buffer of a decoder when compressed video data are randomly decoded. That is, the buffer status 404 is a parameter representing the capacity of data which are to exist in the buffer when the compressed video data are decompressed at the client side. This parameter also varies every dummy data.

In a motion compensation information 405, 8-bit data is set which represents the precision of a motion vector, and in an expansion information 406, 1-bit data is set which represents whether expansion information exists. For example, when it is "0", not expansion information is assumed to exist. A slice start code 407 is a synchronous code for starting a slice, and it is set with 32-bit information. In a quantization step 408 5-bit data is set which fixes a step amount for quantization, and in an expansion information 409, 1-bit data is set which represents whether expansion information exists. For example, when "0" is set, no expansion information is assumed to exist. In a macroblock position information 410, 1-bit data is set which represents the position on the screen.

In a macroblock type 411, data is set which represents the type of a microblock. As an example, "001" is set as data representing that a macroblock is coded by using preceding interframe prediction.

In a motion compensation information 412, data is set which represents the value of a motion vector. As an example, "11" is set as 2-bit data representing that the value of the motion vector is equal to zero.

Of the parameters as described above, the parameters other than the display order 402 within a GOP, the picture type 403 and the buffer condition 404 are not dependent on dummy data, and thus are fixed.

The dummy data are used to substantially reduce the frame rate without reducing the frame rate on the data format of the compressed video data. That is, by replacing a frame by this dummy data, the frame rate can be substantially reduced without altering the number of frames during one second (without reducing the frame rate).

The data capacity of such dummy data is smaller than that of the data amount of a picture which is converted by the dummy data, and further the dummy data are determined so that they have no effect on preceding and subsequent frames (induce no disturbance in images) even when the dummy data are decompressed. FIGS. 4A and 4B show an example of the dummy data having the above feature.

Next, the control information will be described.

Figure 12:
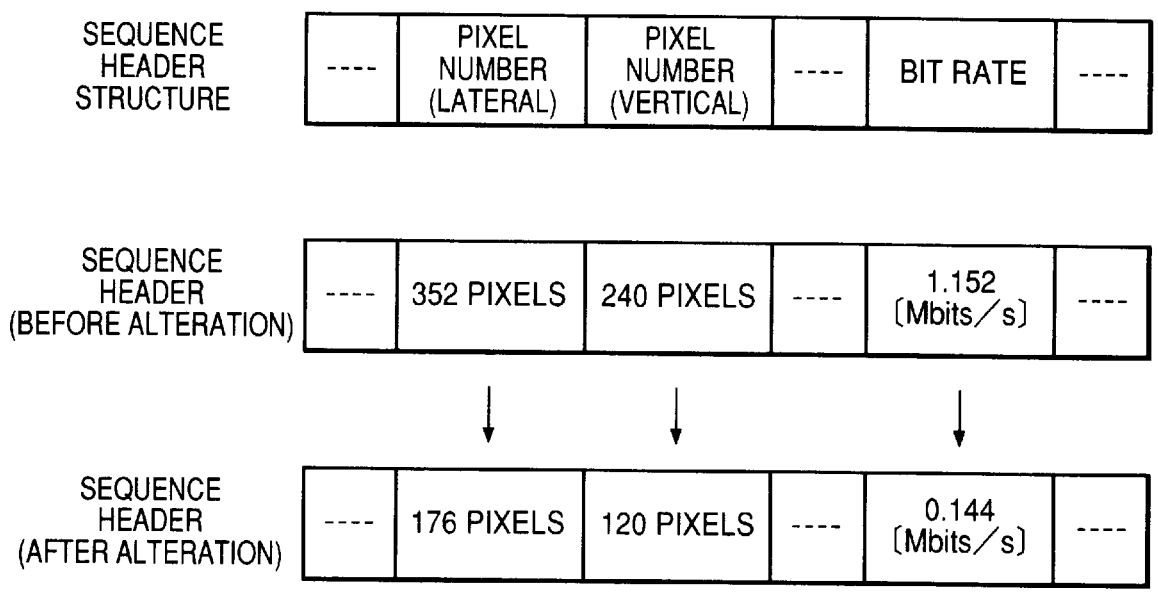
FIG. 12 is a diagram showing control information.
Figure 13:
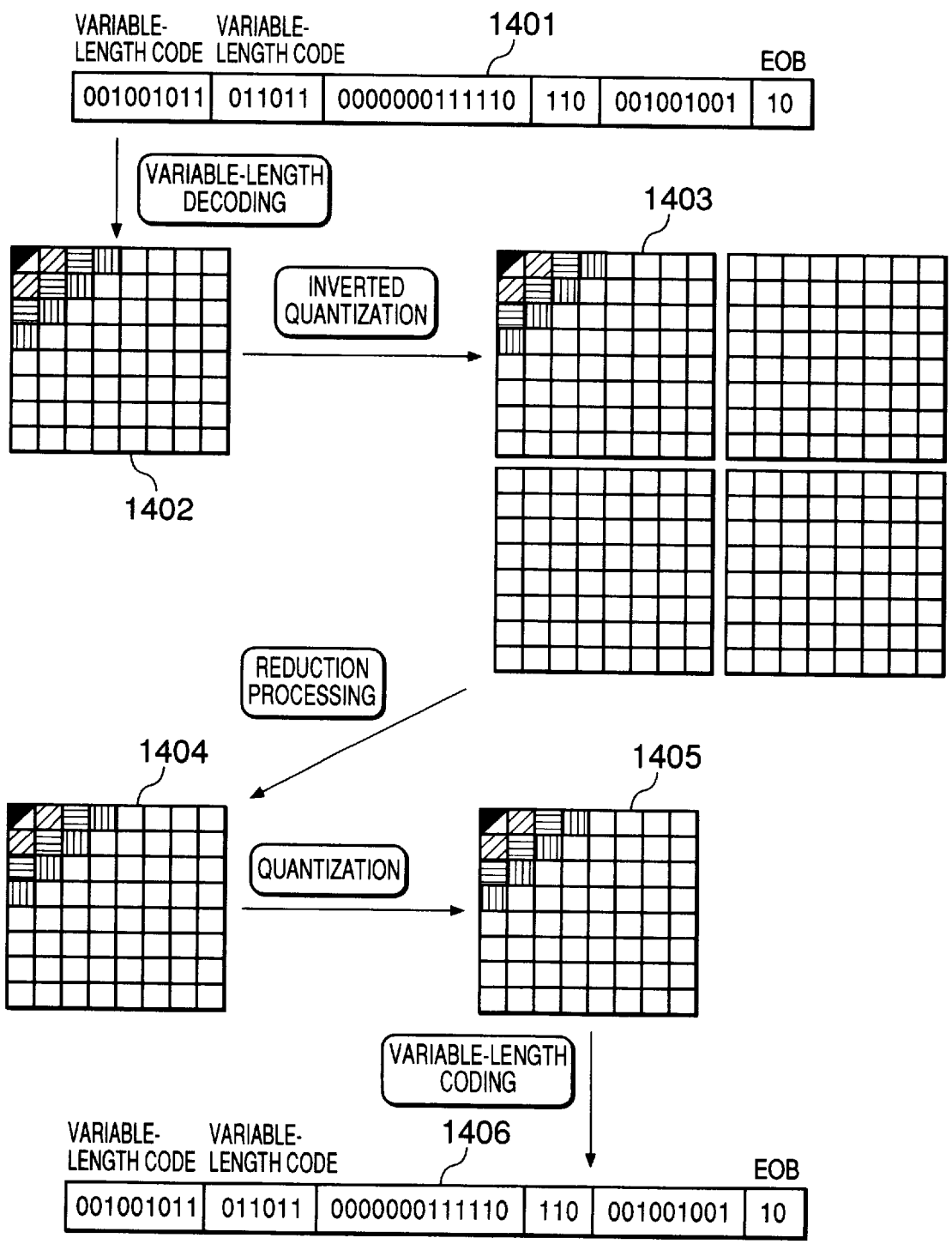
FIG. 13 is a diagram showing the variation of video data in each processing step.

FIG. 12 is a diagram showing the structure of control information (sequence header), and preceding and subsequent control information which is altered by the processing in step 301. Such control information is added to the compressed video data as header information.

The control information represents the characteristics of video data, and for example, it is constructed to have various parameters such as the number of pixels (horizontal), the number of pixels (vertical), bit rate, frame rate, etc.

In the case of FIG. 12, the control information "352 pixels in pixel number (horizontal), 240 pixels in pixel number (vertical), 1.152 (Mbits/s) in bit rate" is varied to "176 pixels in pixel number (horizontal), 120 pixels in pixel number (vertical), 0.144 (Mbits/s) in bit rate". The altering processing of the control information as described above is performed by DSP 201 so as to match the data amount after the reduction processing.

The processing content of the present invention will be described with reference to FIG. 3.

First, the altering processing of the control information is performed in step 301. The data representing the pixel number and the data representing the bit rate, contained in the control information, are altered on the basis of the request pixel number and the request bit rate respectively. In the following description, the alteration of the pixel number and the bit rate will be described, although, the other parameters may be altered.

Subsequently, in step 302, the picture type is identified. If the picture type is identified as an intra-coded frame (hereinafter referred to as an "I picture"), the process goes to step 303. If it is identified as a predictive-coded frame (hereinafter referred to as a "P picture") or a bidirectional predictive-coded frame (hereinafter referred to as a "B picture"), the process goes to step 304. The identification of the picture type is performed by referring to type data which are added as header information for the compressed video data.

Figure 5:
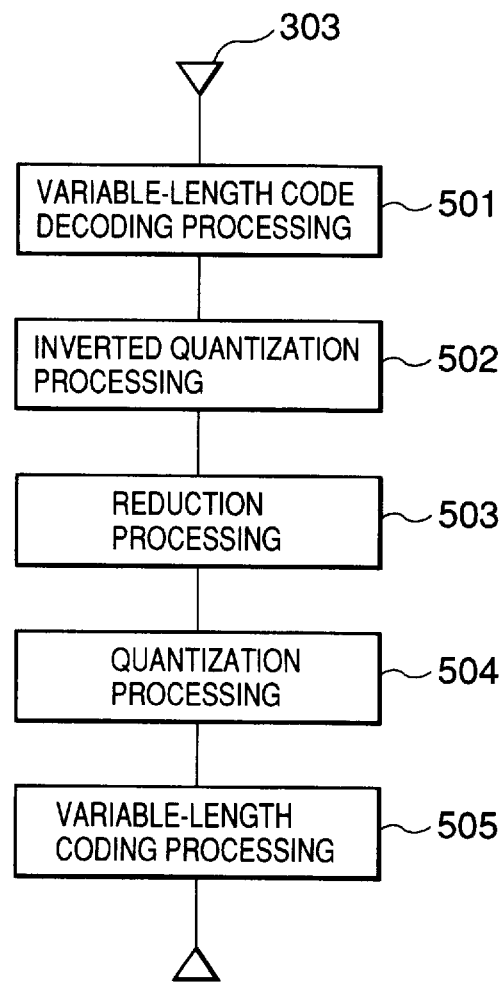
FIG. 5 is a flowchart showing I picture reducing processing.

Next, the processing flow of the step 303 will be described with reference to FIGS. 5 and 14. FIG. 5 is a flowchart showing the more detailed processing flow of the step 303, and FIG. 14 is a diagram showing the variation of video data in accordance with the processing of the step 303.

First, in step 501, a variable-length code 1401 is converted to a quantization coefficient 1402. That is, the processing which starts from the calculation of DC component (direct current) data at the upper left corner and gradually shifts to the calculation of AC (alternative current) component data. Subsequently, in step 502, a calculated inverted quantization coefficient 1402 is converted to a spatial frequency component 1403.

Next, in step 503, the spatial frequency component 1403 which is obtained by the conversion processing is processed to obtain a spatial frequency component 1404 which is reduced to have the pixel number indicated by the request pixel number.

Figure 14:
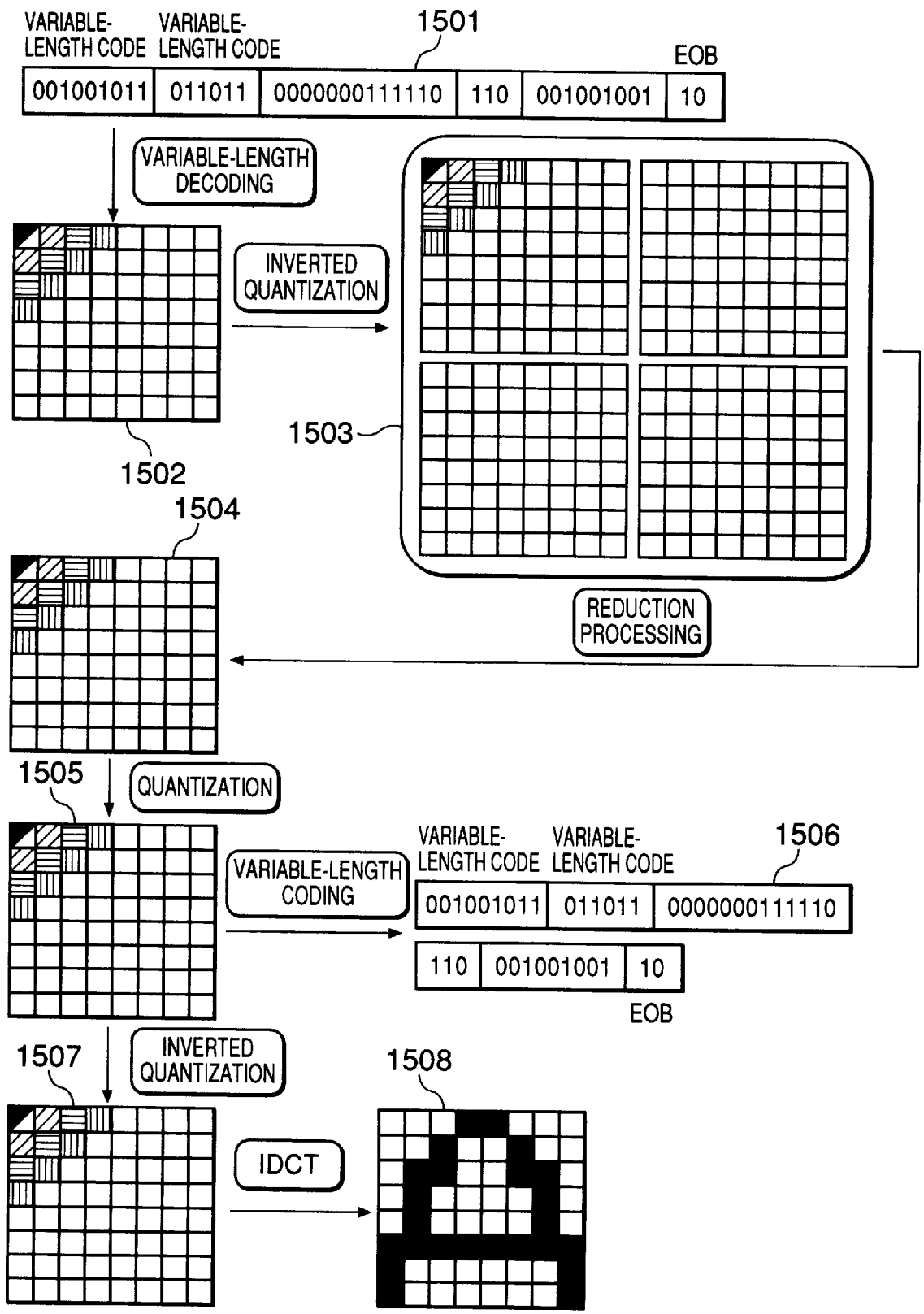
FIG. 14 is a diagram showing the variation of video data in each processing step.

In the case of FIGS. 5 and 14, four kinds of data of "8×8 blocks" are collected, and one "8×8-block" data item is generated for these collected data. The processing technique of collecting plural kinds of block data (8×8 blocks in this case) and then converting these data to one block data having a predetermined pixel number as described above is well known, and thus the detailed description thereof is omitted.

Subsequently, in step 504, a quantization step is determined on the basis of the request data amount to quantize the spatial frequency component 1404 and obtain the quantization coefficient 1405. In step 505, the quantization coefficient 1405 is converted to a variable-length code 1406, and the variable-length code 1406 is stored in RAM 202. With the above processing, the processing of the step 303 is completed.

Subsequently, in step 304 of FIG. 3, dummy data are stored in the RAM 202 to exchange the P picture or B picture for the dummy data.

Subsequently, it is judged in step 305 whether an end code exists at a position subsequent to the picture for which the picture type is identified in step 302. If the end code is detected, the video data reduction processing is ended. If the end code is not detected, the process goes to step 302. The end code is added to the final position of the compressed video data in advance.

According to the above-described first embodiment of the present invention, the data amount of the MPEG-formatted video data can be reduced by a small amount of processing while suppressing the loss in image quality.

If the gateway to which the present invention is applied is fabricated, the data amount of the MPEG-formatted video data which are received from a high-speed communication network could be reduced using only a small amount of processing while keeping excellent image quality to generate low-capacity video data, and the generated low-capacity video data can be transmitted to clients through a low-speed communication network, making the transmission of the video data to the clients at high speed possible.

Next, a second embodiment in which the present invention is applied to a video server will be described.

Figure 6:
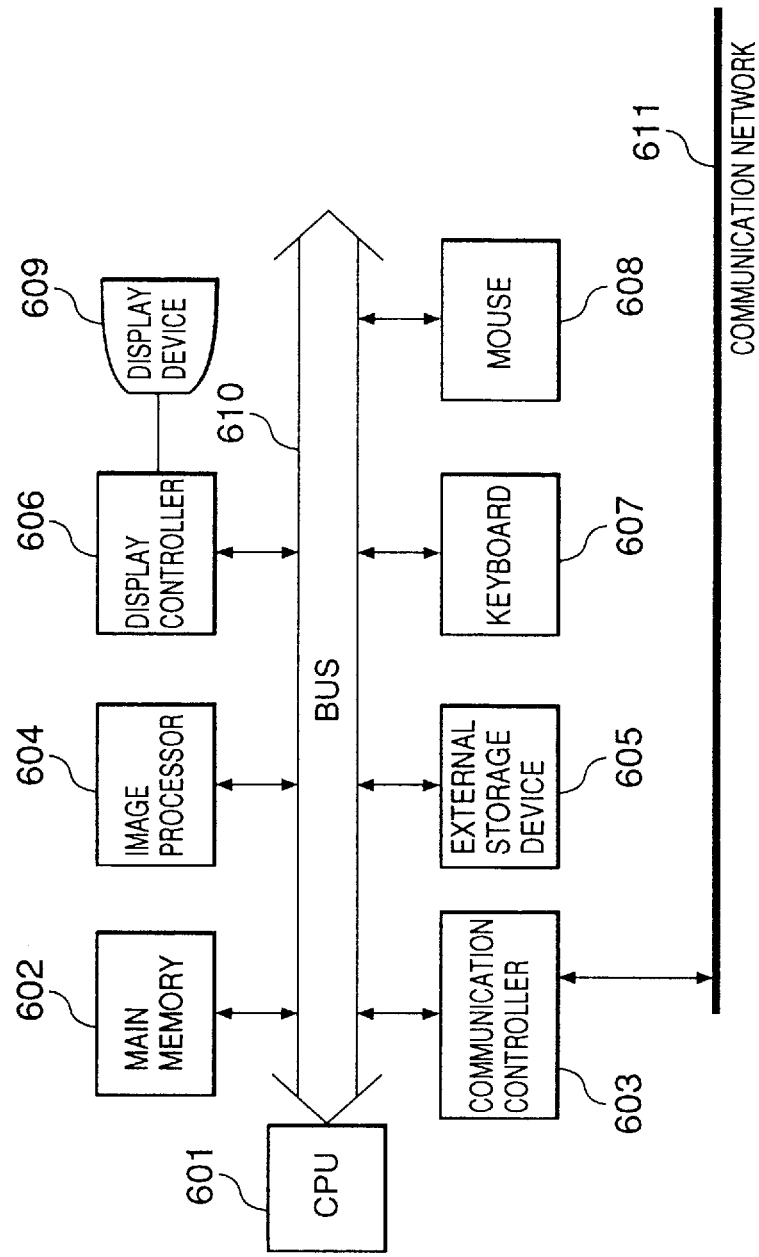
FIG. 6 is a block diagram showing the construction of a video server according to another embodiment of the present invention.

As shown in FIG. 6, a video server is designed to have a CPU 601, a main memory 602, a communication controller 603, an image processor 604, an external storage device 605, a display controller 606, a keyboard 607, a mouse 608, a display device 609 and a bus 610, and the communication controller 603 is connected to a communication network 611.

The CPU 601 controls the data transmission, etc. through the main memory 602, the communication controller 603, the external storage device 605, the display controller 606, the keyboard 607, the mouse 608 and the bus 610.

The CPU 601 receives a request data amount and a request image size which is input through the keyboard 607 or the mouse 608 by an user of the video server, and outputs the request data amount and the request image size to the image processor 604.

Further, the CPU 601 receives video data from the external storage device 605 to perform processing of outputting the video data thus obtained to the image processor 604 and processing of receiving low-capacity video data which are subjected to the data reduction processing by the image processor 604 and outputting the received low-capacity video data through the communication controller 603 to the communication network 611.

The device may be designed so that the CPU 601 receives the request data amount and the request image size from the client side through the communication controller 603 and the communication network 611, or the user of the video server or the video server itself investigates the transmission speed of the communication network 611 and to automatically convert the investigated transmission speed to the request data amount and the request image size.

The main memory 602 is adapted to store various kinds of data, a processing program of the server, etc., and for example, it is constructed by a semiconductor memory.

The communication controller 603 functions to control the data transmission between the video server and the communication network 611.

The external storage device 605 is adapted to store various data, a processing program of the server, etc. A storage medium such as a magnetic disk, a magnetic tape, an optical disk, a magneto-optical disk or the like can be detachably mounted in the external storage device 605, and the access to the storage medium is allowed when the storage medium is loaded into the external storage device 605. The compressed video data are stored beforehand in the storage medium.

The display controller 606 is adapted to receive display data from the CPU 601, convert the display data to display signals and then output the display signals onto the display screen of the display device 609.

The communication network 611 is constructed by a network such as a LAN, ATM network, B-ISDN, N-ISDN, analog telephone line network or the like.

Figure 7:
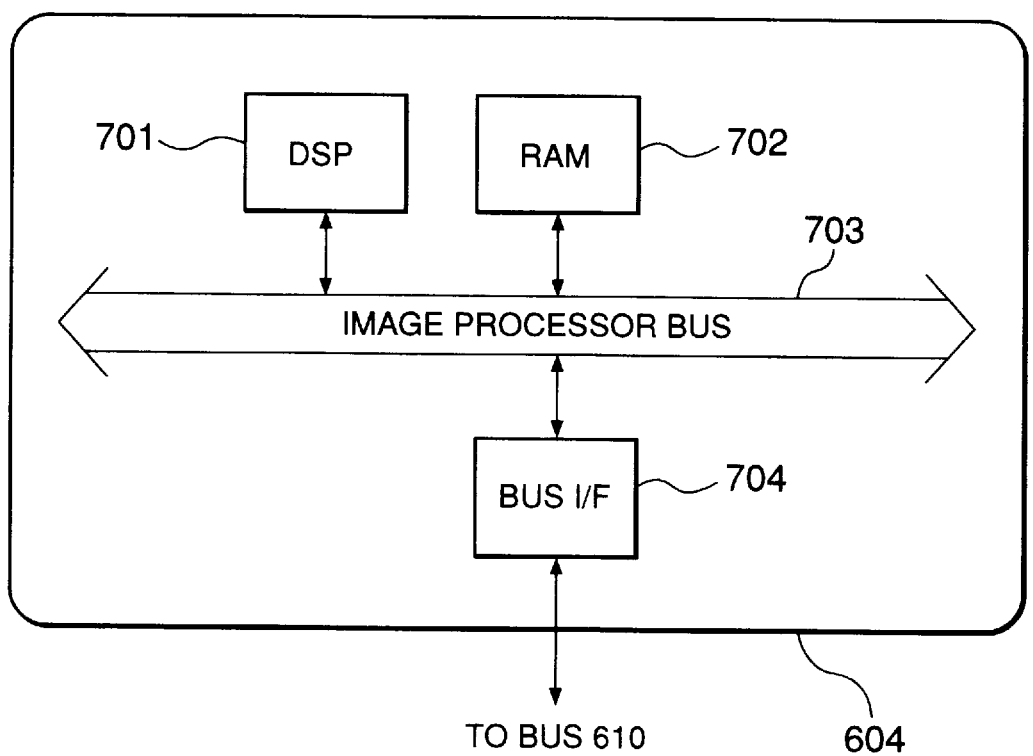
FIG. 7 is a block diagram showing the construction of an image processor of the video server shown in FIG. 6.

Here, the construction of the image processor 604 which is the main part of this embodiment will be described in more detail with reference to FIG. 7. As shown in FIG. 7, the image processor 604 is constructed to have a DSP 701, RAM 702, an image processor bus 703 and a bus I/F 704, and the bus I/F 704 is connected to the bus 610.

The DSP 701 is adapted to perform the reduction processing of the data amount of the compressed video data according to the preset program, and the RAM 702 functions as a memory area of the program or a work area.

The image processor bus 703 is used for the data transmission among the constituent elements of the image processor 604, and the bus I/F 704 functions as an interface which is interposed between the bus 610 and the image processor bus 703.

The processing of the image processor 604 is carried out as follows.

The data transmission between the RAM 702 and the CPU 601 is performed under the control of the CPU 601, and the DSP 701 executes software stored in the RAM 702 to perform the processing other than the data transmission between the RAM 702 and the CPU 601. For example, the system may be designed so that a data amount reducing program for compressed video data, which is stored in the external storage device 605, is loaded onto the RAM 702 through bus 610, the bus I/F 704 and the image processor 703 at the start-up time of the system.

In this system, the processing in which the data amount of the MPEG1-formatted video data stored in the external storage device 605 is reduced and the MPEG1-formatted low-capacity video data is created to be transmitted through the communication network 611 to the client side will now be explained.

In order to describe the processing content specifically, the process flow of the data amount reduction processing of the compressed video data which is performed by the image processor 604 will be described with reference to FIG. 8.

Figure 8:
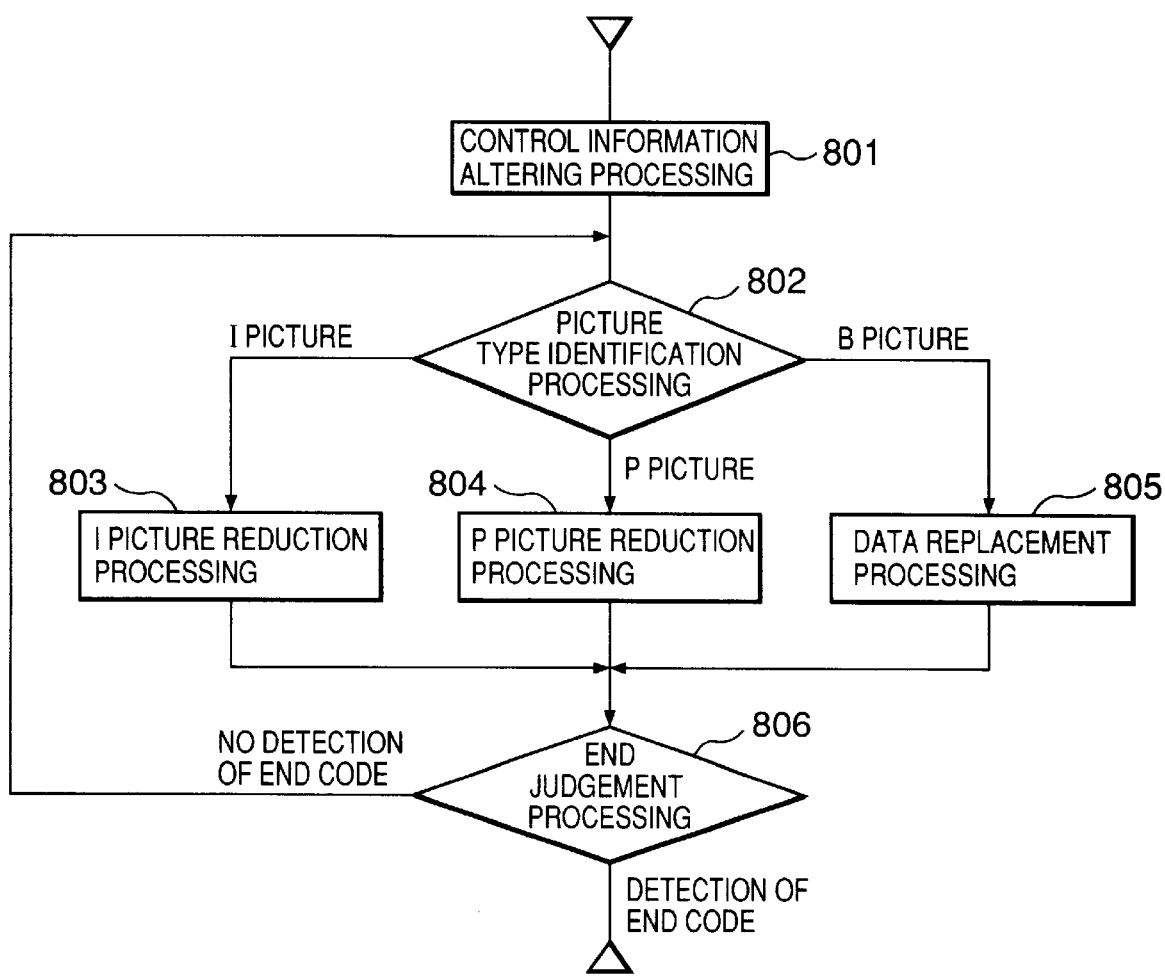
FIG. 8 is a flowchart showing the data amount reducing processing.

FIG. 8 is a flowchart showing the process flow of the data amount reducing processing of the compressed video data in a second embodiment. In the second embodiment, plural kinds of compressed video data are stored beforehand in the external storage device 605. Although not shown, a command for transmission of specific video data is received through the communication network 611 and the communication controller 603, and the compressed video data corresponding to the video data are obtained from the external storage device 605 and then transmitted to the client after the data reduction processing. A series of processing steps as described above is performed by the DSP 701 and the CPU 601. At the client side receiving the compressed video data which is subjected to the data reduction processing, the decompression processing of the compressed video data is performed to display moving images.

First, in step 801, the data representing the pixel number and the data representing the bit rate in the control information are altered to the request pixel number and the request bit rate respectively, and the control information thus altered is stored in the RAM 702. In this embodiment, the pixel number and the bit rate are altered, although, the other parameters may be altered.

Subsequently, the picture type is identified. If it is the I picture, the process goes to step 803. If it is the P picture, the process goes to step 804, and if it is the B picture, the process goes to step 807. The picture type is added as header information for the compressed video data, and the DSP 701 identifies the picture type by referring to the header information.

Figure 9:
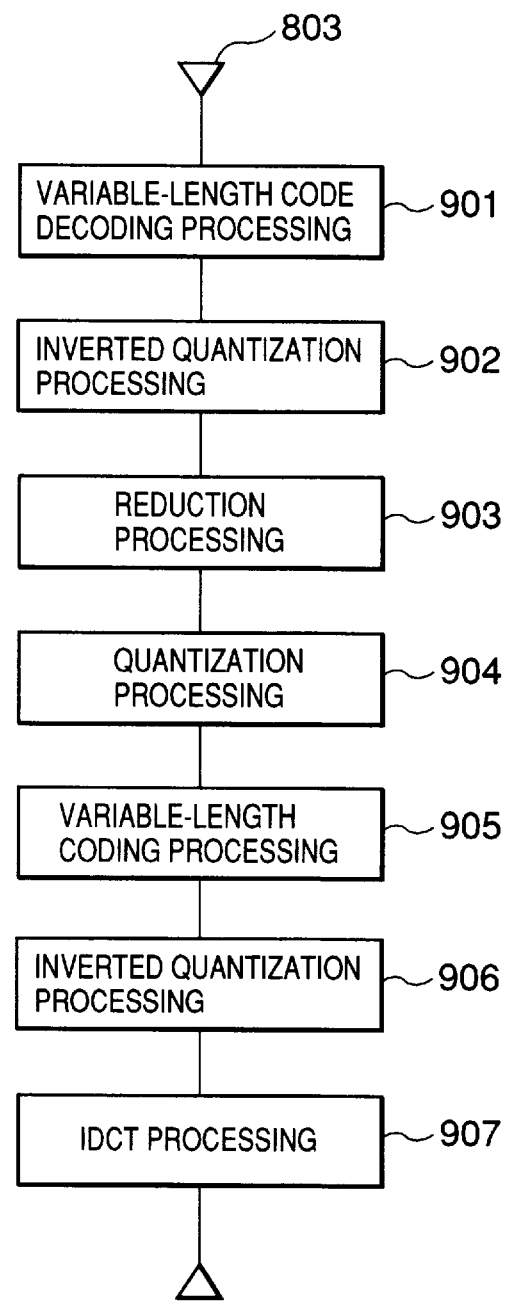
FIG. 9 is a flowchart showing I picture reducing processing.

The processing procedure of the next step 803 is the main processing, and thus it will be described with reference to FIGS. 9 and 14. FIG. 9 is a flowchart showing the process flow of the step 803, and FIG. 14 is a diagram showing the variation of the video data in accordance with the processing of the step 803.

First, in step 901 a variable-length code 1501 is converted to a quantization coefficient 1502. That is, those data which contain DC component data at the upper left corner and AC component data at the other positions (whose frequency increases toward the lower right corner) are obtained on the basis of the variable-length code 1501.

Subsequently, the calculated quantization coefficient 1502 is converted to the spatial frequency component 1503 in step 902.

Subsequently, in step 903 the calculation is performed on the spatial frequency component 1503 to obtain a spatial frequency component 1504 which is subjected to the reduction processing so as to have a pixel number indicated by the request pixel number.

In the case of FIGS. 9 and 14, four kinds of data of "8×8 blocks" are collected, and one "8×8-block" data item is generated for these collected data. The processing technique of collecting plural kinds of block data (8×8 blocks in this case) and then converting these data to one block data having a predetermined pixel number as described above is well known, and thus the detailed description thereof is omitted.

Subsequently, in step 904, a quantization step is determined on the basis of the request bit rate, and the spatial frequency component 1504 is quantized by using the determined quantization step to obtain the quantization coefficient 1505.

Subsequently, in step 905, the quantization coefficient 1505 is converted to a variable-length code 1506, and the variable-length code 1506 is stored into RAM 702. In step 906, the quantization coefficient 1505 is converted to a spatial frequency component 1507 through an inverted quantization method. Subsequently, in step 907, the spatial frequency component 1507 is converted to image data 1508, and the image data 1508 are stored as a "reference image" as described later, into the RAM 702.

Here, the processing flow of the step 804 which is the main part of the present invention will be described with reference to FIGS. 10 and 15.

Figure 10:
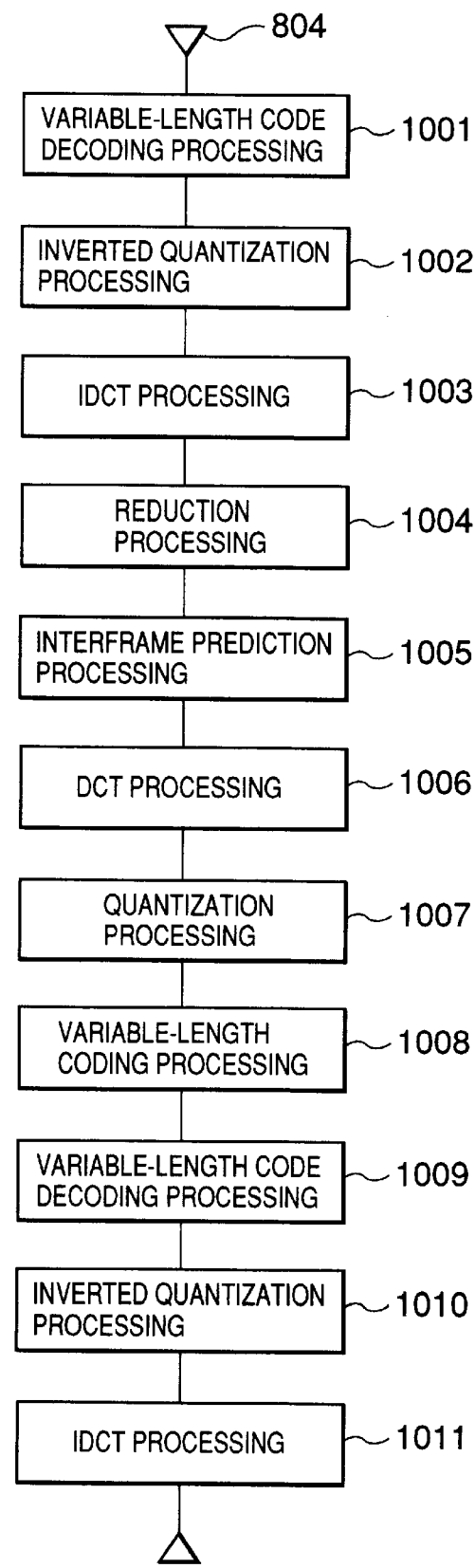
FIG. 10 is a flowchart showing P picture reducing processing.
Figure 15:
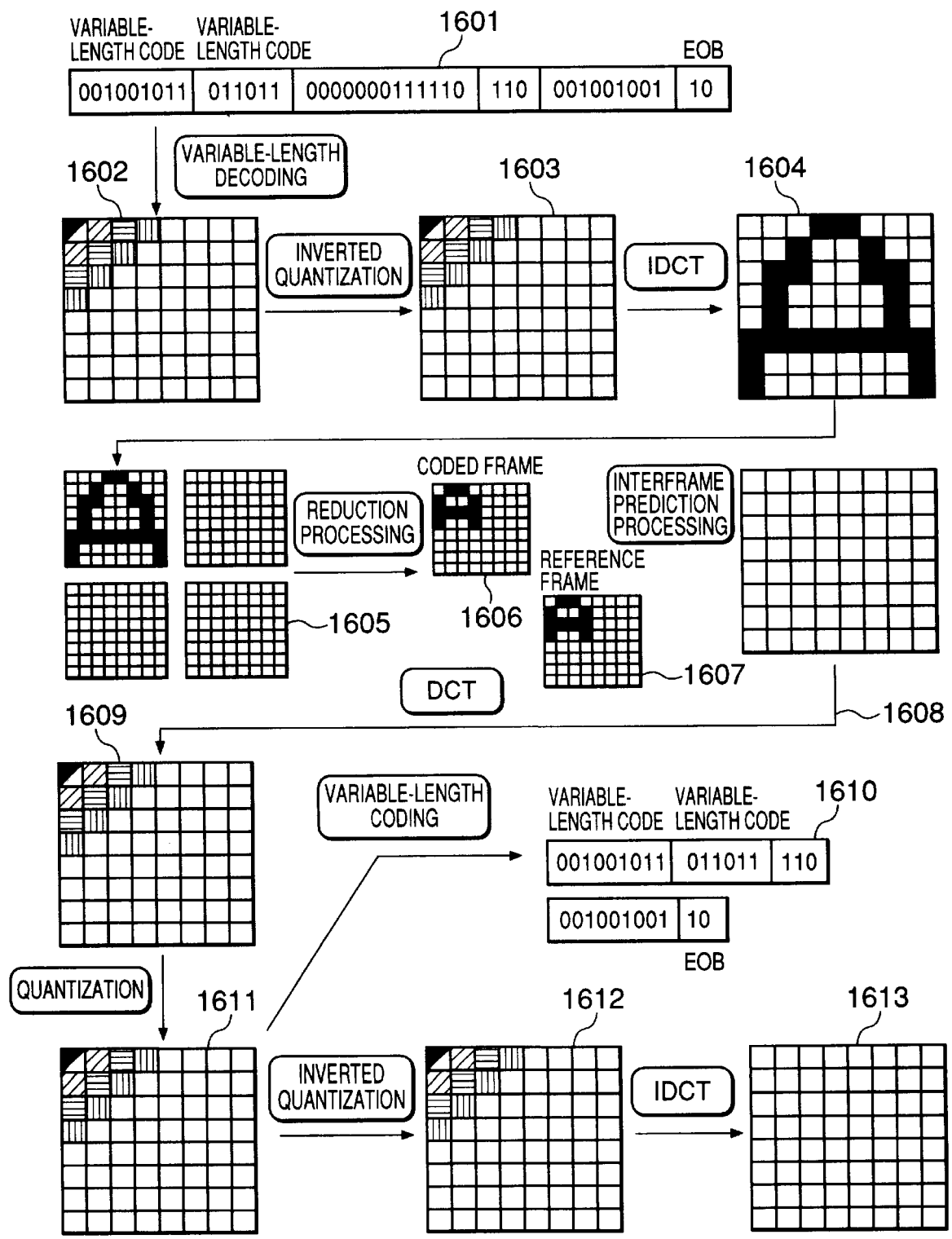
FIG. 15 is a diagram showing the variation of video data in each processing step.

FIG. 10 is a flowchart showing the processing flow of the P-picture reducing processing (step 804), and FIG. 15 is a diagram showing the variation of the video data in accordance with the processing of the step 804.

First, in step 1001 a variable-length code 1601 of a P picture is converted to a quantization coefficient 1602. That is, those data which contain DC component data at the upper left corner and AC component data at the other positions (whose frequency increases toward the lower right corner) are determined on the basis of the variable-length code 1601.

Subsequently, in step 1002, the quantization coefficient 1602 is converted to the spatial frequency component data 1603 with the inverted quantization. Subsequently, in step 1003, IDCT processing is performed, specifically, the spatial frequency component 1603 is converted to image data 1604.

Subsequently, in step 1004, the image data 1604 is subjected to the reduction processing to obtain reduced image data 1605. In the case of FIGS. 10 and 15, four kinds of "8×8 block" data are collected, and one "8×8 block" data are generated.

Subsequently, in step 1005, the interframe prediction processing, that is, the differential value between the reduced image data 1606 and the reference image 1607 stored in the RAM 702 is calculated to obtain differential data 1608. At this time, motion compensation processing is preferably performed.

Subsequently, in step 1006, the differential data 1608 is converted to a spatial frequency component 1609, and then in step 1007 the quantization step is determined on the basis of the request data amount, and the spatial frequency component 1609 is quantized by using the quantization step to obtain a quantization coefficient 1610.

Subsequently, in step 1008, the quantization coefficient 1610 is converted to a variable-length code 1611, and the variable-length code 1611 is stored into the RAM 702.

Subsequently, in step 1010, the quantization coefficient 1610 is converted to a spatial frequency component 1612 by the inverted quantization processing. Thereafter, in step 1011, the IDCT processing of converting the spatial frequency component 1612 to image data 1613 is performed. Further, the image data 1613 are coded in the RAM 702 as a reference image of a frame to be next coded.

In step 805 of FIG. 8, the dummy data are stored in the RAM 702 to replace the B picture by the dummy data. Subsequently, in step 806, it is judged whether an "end code" representing the end of the video data exists at the position subsequent to the picture for which the picture type is identified in step 802. If the end code is detected, the processing is finished. If no end code is detected, the process goes to step 802. Such an end code is added beforehand to the final position of compressed video data.

With the above-described processing, the picture reducing processing is performed when the picture type is the I picture or P picture, and the data replacement by the dummy data is performed when the picture type is the B picture, whereby the reduction processing of the compressed video data can be performed with a small amount of processing and using a simple construction. Further, there can be constructed a video server system in which compressed video data serving as a reduction processing target are stored in the external storage device in advance, the compressed video data corresponding to an instruction from the client side are obtained from the external storage device, the reduction processing is performed on the data thus obtained, and then the video data after the reduction processing are transmitted to the client.

According to the second aspect of the present invention, the data amount of the MPEG1-formatted video data stored in the storage device of the video server can be reduced with a small amount of processing while keeping the excellent image quality, and the video data are transmitted to the client side through a (low-speed) communication line, whereby a waiting time at the client side can be shortened.

The image processor 104 of the first embodiment may be used in place of the image processor 604 of the second embodiment, and conversely the image processor 604 of the second embodiment may be used in place of the image processor 104 of the first embodiment.

Further, the system may be constructed so that the CPU 101 or 601 executes software loaded in the main memory 102 or 602 to perform the data reduction processing which is performed by the image processor 104 or 604.

Next, a third embodiment according to the present invention will be described.

This embodiment is characterized in that the data after the data amount reduction processing are stored in the external storage device of the gateway provided in the first embodiment.

Accordingly, this embodiment may have the same device construction as the first embodiment, and the processing other than the processing performed by the CPU 101 is the same as the first embodiment.

Next, the processing of reducing the data amount of the MPEG1-formatted video data which are received through the high-speed communication network 111 to create MPEG1-formatted low-capacity video data, and storing the created low-capacity video data into the external storage device 105 will be described.

First, the summary of the processing which is performed by the CPU 101 will be given.

The CPU 101 first receives compressed video data through the high-speed communication network 111 and the communication controller 103, and outputs the compressed video data thus received to the image processor 104.

Subsequently, the CPU 101 investigates the residual storage capacity of the external storage device 105 to calculate the request bit rate and the request pixel number on the basis of the residual storage capacity.

The CPU 101 may read in the request bit rate and the request pixel number which are input through the input operation of the keyboard 107 or the mouse 108 by the user at the gateway, and then output the read-in request bit rate and the request pixel number to the image processor 104. At this time, the user may be allowed to input the request bit rate and the request pixel number in consideration of the residual capacity displayed on the display device 109.

Subsequently, the CPU 101 reads in the low-capacity video data which have been subjected to the data reduction processing while referring to the request bit rate and the request pixel number which are calculated on the basis of the residual storage capacity by the image processor 104, and stores the low-capacity video data into the external storage device 105. That is, the CPU 101 can read out the compressed video data from the external storage device 105, output the compressed video data to the image processor 104 to perform the data amount reduction processing on the compressed video data in consideration of the request bit rate and the request pixel number in accordance with the residual storage capacity, create the low-capacity video data, and store the low-capacity video data into the external storage device 105.

As described above, according to a third embodiment of the present invention, the data amount of the MPEG-formatted video data can be reduced with a small amount of processing while keeping the excellent image quality to create the low-capacity video data, and the created low-capacity video data can be accumulated in the external storage device. Particularly, the compressed video data can be accumulated in accordance with the usable residual storage capacity of the entire storage capacity of the external storage device.

The present invention is not limited to the above embodiments, and various modifications may be made without departing from the subject matter of the present invention.

For example, in the embodiments as described above, the program for actuating the device or system is stored in the external storage device 105. It is needless to say that the external storage device comprises a magnetic disk such as a hard disk, a floppy disk or the like, or an optical disk such as a CD-ROM.

Further, in the specification of the present invention, the term "means" may contain not only a "physical means", but also each means whose function is achieved by software.

Still further, the function of one means or member may be achieved by two or more physical means or members, or the function of two or more means or members may be achieved by one means or member.

According to the present invention, the means for reducing the data amount of the compressed video data with a small amount of processing using a simple system construction can be achieved, as well as an information processing device such as a gateway, a video server or the like which distributes moving images having proper image quality in accordance with the transmission speed of each network. In addition, a device for reading in the compressed video data stored in a storage device and supplying moving images having proper image quality can be achieved.

What is claimed is:

1. A data amount reducing device for reducing the data amount of compressed video data which have been compressed according to a predetermined compression rule, characterized in that the compressed video data includes a control information portion comprising control information which contains information on picture size and bit rate and is adapted to determine the characteristics of the compressed video data, and that a data portion comprising compressed video data of plural frames, and said data amount reducing device includes intraframe predicted picture data amount reducing means for reducing the data amount of intra-coded frames which are contained in said data portion and have been compressed by using no correlative relationship with other frames, control information altering means for altering the control information so as to match the compressed video data after the reduction processing by said intraframe predicted picture data amount reducing means, and replacing means for replacing both of interframe predicted frames contained in the data portion and compressed by using the correlative relationship with past frames and bidirectional predictive-coded frames contained in the data portion and compressed by using the correlative relationship with past and future frames, by predetermined dummy data having a smaller capacity than that of each frame, wherein the dummy data are data which have no effect on the pictures of the other frames after being subjected to decompression processing.

2. A data amount reducing device for reducing the data amount of compressed video data which are compressed according to a predetermined compression rule, characterized in that the compressed video data includes a control information portion comprising control information which contains information on picture size and bit rate and is adapted to determine the characteristics of the compressed video data, and that said data amount reducing device includes intraframe predicted picture data amount reducing means for reducing the data amount of intra-coded frames which are contained in the data portion and have been compressed by using no correlative relationship with other frames, interframe predictive image data amount reducing means for reducing the data amount of predictive-coded frames which are contained and have been compressed by using the correlative relationship with past frames, control information altering means for altering the control information so as to meet the compressed video data after the reduction processing by said intraframe predicted picture data amount reducing means and said interframe predictive image data amount reducing means, and replacing means for replacing bidirectional predictive-coded frames contained in said data portion and compressed by using the correlative relationship with past and future frames, by predetermined dummy data having a smaller capacity than that of each frame, wherein the dummy data are data which have no effect on the pictures of the other frames after being subjected to decompression processing.

3. A data amount reducing system for reducing the data amount of compressed video data, including:

a data amount reducing system for reducing the data amount of compressed video data which have been compressed according to a predetermined compression rule, in which the compressed video data includes a control information portion comprising control information which contains information on picture size and bit rate and is adapted to determine the characteristics of the compressed video data, and a data portion comprising compressed video data of plural frames, said data amount reducing device including intraframe predicted picture data amount reducing means for reducing the data amount of intra-coded frames which are contained in said data portion and have been compressed by using no correlative relationship with other frames, and control information altering means for altering the control information so as to match the compressed video data after the reduction processing by said intraframe predicted picture data amount reducing means; and a network interface for connecting each of a first network and a second network, wherein said data amount reducing device reduces the data amount of the compressed video data which are received from said first network, and then transmitting the compressed video data which have been reduced in data amount to said second network.

4. A data amount reducing system for compressed video data, including:

a data amount reducing device for reducing the data amount of compressed video data which are compressed according to a predetermined compression rule, in which the compressed video data includes a control information portion comprising control information which contains information on picture size and bit rate and is adapted to determine the characteristics of the compressed video data, said data amount reducing device including intraframe predicted picture data amount reducing means for reducing the data amount of intra-coded frames which are contained in the data portion and have been compressed by using no correlative relationship with other frames, interframe predictive image data amount reducing means for reducing the data amount of predictive-coded frames which are contained and have been compressed by using the correlative relationship with past frames, and control information altering means for altering the control information so as to match the compressed video data after the reduction processing by said intraframe predicted picture data amount reducing means and said interframe predictive image data amount reducing means; and a network interface for connecting each of a first network and a second network, wherein said data amount reducing device reduces the data amount of the compressed video data which are received from said first network, and then transmitting the compressed video data which have been reduced in data amount to said second network.

5. A data amount reducing method for reducing the data amount of compressed video data which have been compressed according to a predetermined compression rule, characterized in that the compressed video data includes a control information portion comprising control information which contains information on picture size and bit rate and is adapted to determine the characteristics of the compressed video data, and a data portion comprising compressed video data of plural frames, said data amount reducing method comprising:

a step of reducing the data amount of intra-coded frames which are contained in the data portion and have been compressed by using no correlative relationship with other frames;

a step of replacing each of predictive-coded frames contained in the data portion and compressed by using the correlative relationship with past frames and bidirectional predictive-coded frames contained in the data portion and compressed by using the correlative relationship with past and future frames, by predetermined dummy data which has a smaller capacity than each of the frames and has no effect on the pictures of the other frames even when subjected to decompression processing; and altering the control information so as to match the compressed video data after the reducing processing and the replacement processing.

6. A data amount reducing method for reducing the data amount of compressed video data which have been compressed according to a predetermined compression rule, characterized in that the compressed video data includes a control information portion comprising control information which contains information on picture size and bit rate and is adapted to determine the characteristics of the compressed video data, and a data portion comprising compressed video data of plural frames, said data amount reducing method comprising:

reducing the data amount of intra-coded frames which are contained in the data portion and have been compressed by using no correlative relationship with other frames;

reducing the data amount of predictive-coded frames contained in the data portion and compressed by using the correlative relationship with past frames; and replacing bidirectional predictive-coded frames contained in the data portion and compressed by using the correlative relationship with past and future frames, by predetermined dummy data which has a smaller capacity than each of the frames and has no effect on the pictures of the other frames even when subjected to decompression processing; and altering the control information so as to match the compressed video data after the reducing processing and the replacement processing.

7. A storage medium for storing a data amount reducing method for reducing the data amount of compressed video data which have been compressed according to a predetermined compression rule, the compressed video data including a control information portion comprising control information which contains information on picture size and bit rate and is adapted to determine the characteristics of the compressed video data, and a data portion comprising compressed video data of plural frames, wherein said data amount reducing method comprises:

a step of reducing the data amount of intra-coded frames which are contained in the data portion and have been compressed by using no correlative relationship with other frames;

a step of replacing each of predictive-coded frames contained in the data portion and compressed by using the correlative relationship with past frames and bidirectional predictive-coded frames contained in the data portion and compressed by using the correlative relationship with past and future frames, by predetermined dummy data which has a smaller capacity than each of the frames and has no effect on the pictures of the other frames even when subjected to decompression processing; and altering the control information so as to match the compressed video data after the reducing processing and the replacement processing.

8. A storage medium for storing a data amount reducing method for reducing the data amount of compressed video data which have been compressed according to a predetermined compression rule, the compressed video data including a control information portion comprising control information which contains information on picture size and bit rate and is adapted to determine the characteristics of the compressed video data, and a data portion comprising compressed video data of plural frames, wherein said data amount reducing method comprises:

reducing the data amount of intra-coded frames which are contained in the data portion and have been compressed by using no correlative relationship with other frames;

reducing the data amount of predictive-coded frames contained in the data portion and compressed by using the correlative relationship with past frames; and replacing bidirectional predictive-coded frames contained in the data portion and compressed by using the correlative relationship with past and future frames, by predetermined dummy data which has a smaller capacity than each of the frames and has no effect on the pictures of the other frames even when subjected to decompression processing; and altering the control information so as to match the compressed video data after the reducing processing and the replacement processing.

* * * * *